(12) United States Patent
Goyal et al.

(10) Patent No.: US 7,701,682 B2
(45) Date of Patent: Apr. 20, 2010

(54) ELECTROSTATIC DISCHARGE PROTECTION

(75) Inventors: Abhijat Goyal, Chandler, AZ (US); Chai Ean E. Gill, Chandler, AZ (US); James D. Whitfield, Gilbert, AZ (US)

(73) Assignee: Freescale Semiconductors, Inc., Austin, TX (US)

( * ) Notice: Subject to any disclaimer, the term of this patent is extended or adjusted under 35 U.S.C. 154(b) by 241 days.

(21) Appl. No.: 12/023,181

(22) Filed: Jan. 31, 2008

(65) Prior Publication Data

US 2009/0195944 A1 Aug. 6, 2009

(51) Int. Cl.
 *H02H 9/00* (2006.01)
 *H02H 3/22* (2006.01)
(52) U.S. Cl. .................................. 361/56; 361/111
(58) Field of Classification Search ............. 361/56, 361/91.1–91.8, 93.7–93.9, 111, 118
See application file for complete search history.

(56) References Cited

U.S. PATENT DOCUMENTS

| | | | |
|---|---|---|---|
| 5,276,582 A | 1/1994 | Merrill et al. | |
| 5,477,414 A | 12/1995 | Li et al. | |
| 6,946,707 B2 | 9/2005 | Voldman | |
| 7,009,828 B2 * | 3/2006 | Ito et al. | 361/91.8 |
| 7,064,942 B2 * | 6/2006 | Ker et al. | 361/56 |
| 7,092,227 B2 * | 8/2006 | Ker et al. | 361/56 |
| 7,164,566 B2 | 1/2007 | Xu et al. | |
| 7,529,070 B2 * | 5/2009 | Bhattacharya et al. | 361/56 |
| 7,564,666 B2 * | 7/2009 | Ball et al. | 361/91.5 |
| 2001/0043449 A1 * | 11/2001 | Okushima | 361/56 |
| 2006/0203405 A1 * | 9/2006 | Bhattacharya et al. | 361/91.1 |
| 2009/0021872 A1 * | 1/2009 | Ker et al. | 361/56 |

OTHER PUBLICATIONS

Joshi, S., An analysis of Bipolar Breakdown and its Application to the Design of ESD Protection Circuits, IEEE 01CH137167. 39th Annual International Reliability Physics Symposium, Orlando, Florida, 2001.

(Continued)

*Primary Examiner*—Ronald W Leja
*Assistant Examiner*—Dharti H Patel
(74) *Attorney, Agent, or Firm*—Ingrassia, Fisher & Lorenz, P.C.

(57) ABSTRACT

An electrostatic discharge (ESD) protection device (61, 71), coupled across input-output (I/O) (22) and common (23) terminals of a core circuit (24) that it is intended to protect from ESD events, comprises, multiple serially coupled ESD clamp stages (41, 41'), each stage (41, 41') comprising an interior node (52, 52') and first (32, 32') and second terminal (42, 42') nodes wherein the first terminal node (42) of the first clamp stage (41) is coupled to the common terminal (23) and the second terminal node (42') of the last clamp stages (41') is coupled to the I/O terminals (22). A resistance-capacitance ladder (60) is provided in parallel with some of the clamp stages (41, 41'), with a resistance (R1, R2, R3 etc.) coupled to each of the nodes (32, 52, 65 (42; 32')) of one of the ESD clamp stages (41, 41') by first terminals thereof and capacitors (C1, C2, etc.) are coupled between second terminals of the resistances (R1, R2, R3 etc.). The clamp stages (41, 41') are desirably bi-directional and a diode (D1) may bridge one or more of the clamp stages (e.g., 41) to provide different clamp voltages for different polarity ESD events.

20 Claims, 4 Drawing Sheets

OTHER PUBLICATIONS

Freescale Semiconductor, Inc., ESD clamp, as described on the attached sheet (1 page) and illustrated in Figures 4 and 5 of the present application.

PCT Application No. PCT/US2008/088627; Search Report and Written Opinion; mailed Aug. 18, 2009.

* cited by examiner

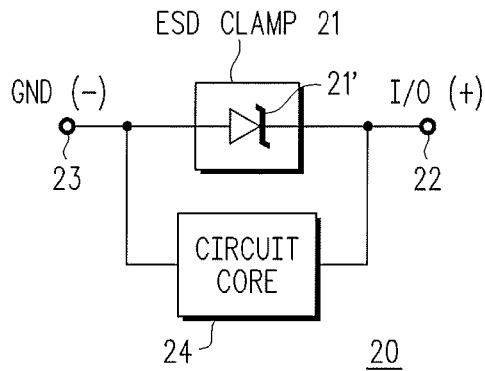
FIG. 1
−PRIOR ART−
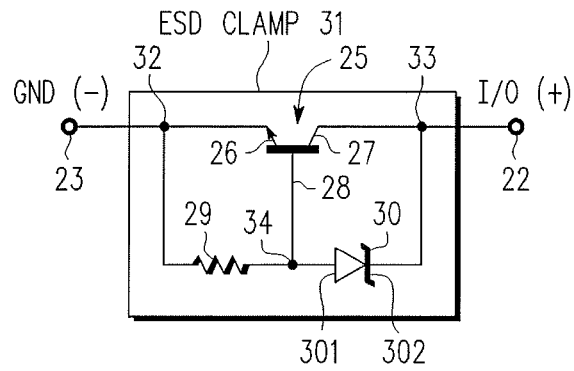
FIG. 2
−PRIOR ART−
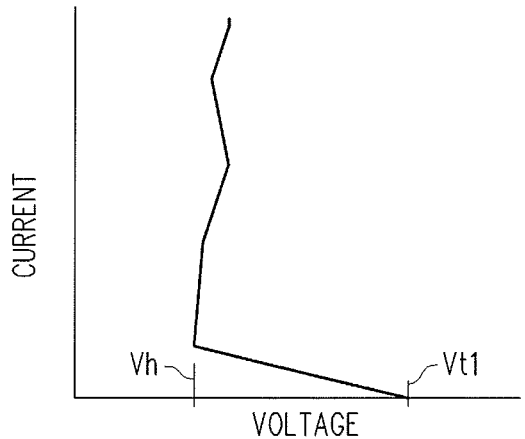
FIG. 3 −PRIOR ART−
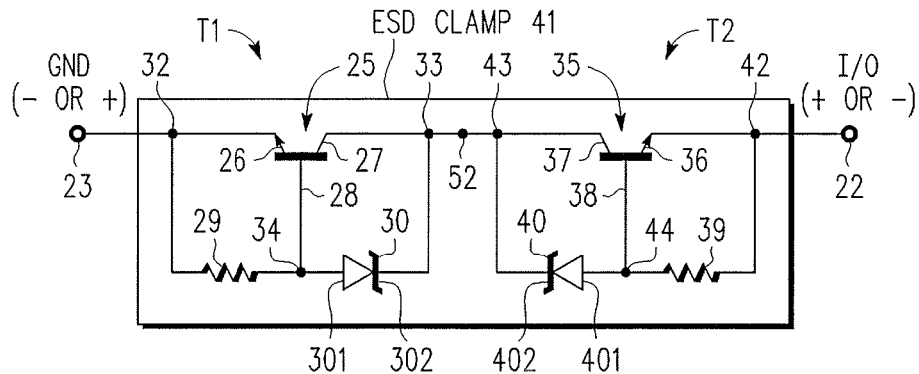
FIG. 4 −PRIOR ART−

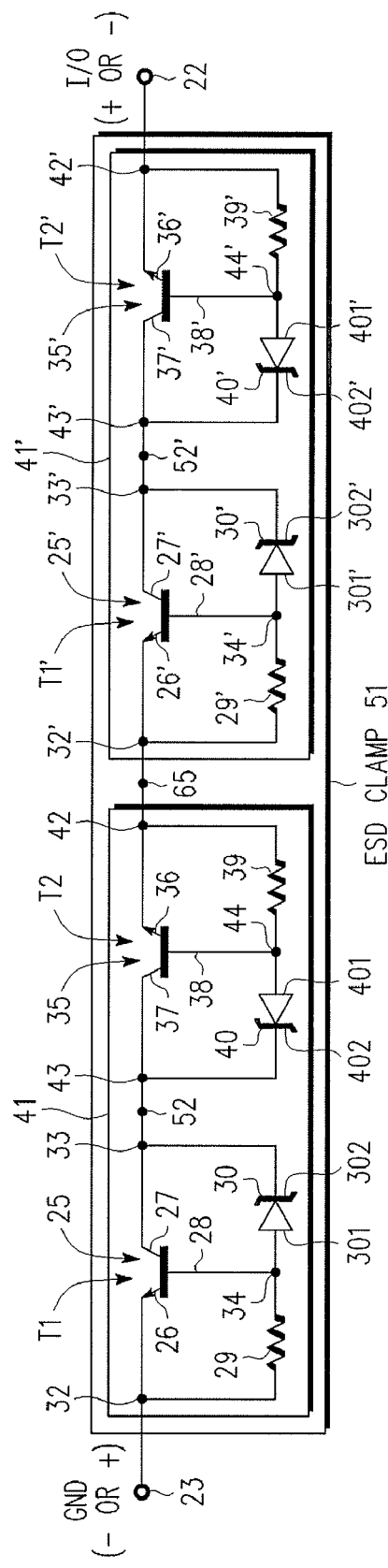
FIG. 5 —PRIOR ART—
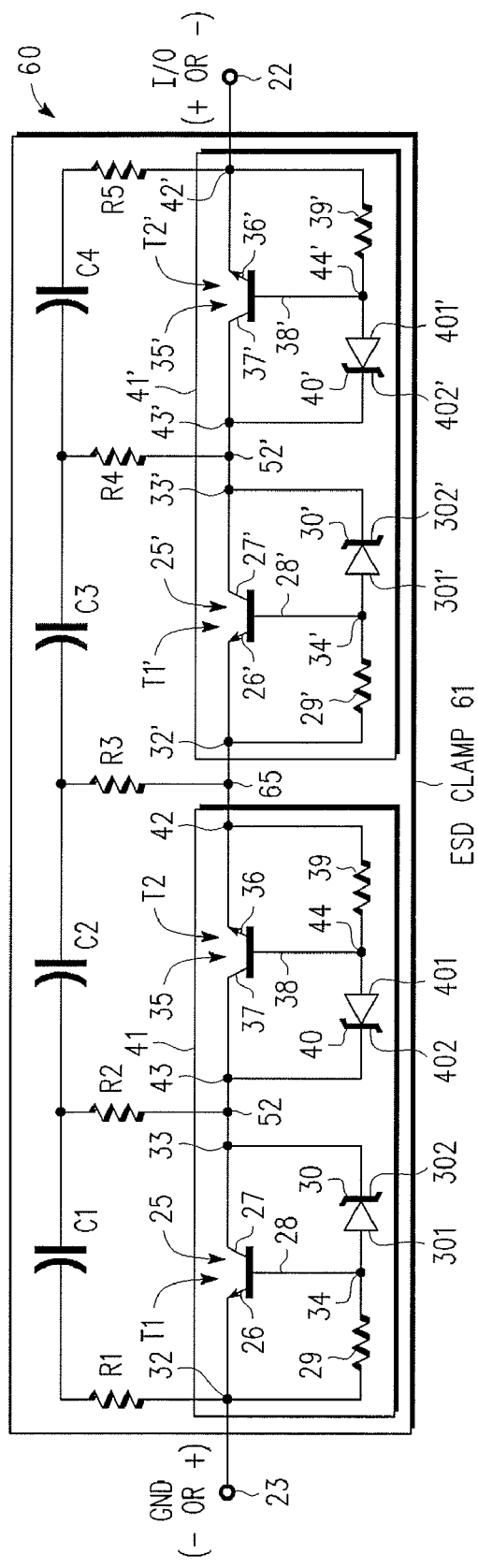
FIG. 6

ELECTROSTATIC DISCHARGE PROTECTION

FIELD OF THE INVENTION

The present invention generally relates to electrostatic discharge (ESD) protection of electronic elements and, more particularly, ESD protection of semiconductor components and integrated circuits.

BACKGROUND OF THE INVENTION

Modern electronic devices, especially semiconductor (SC) devices and integrated circuits (ICs) are at risk of damage due to electrostatic discharge (ESD) events. It is well known that electrostatic discharge from handling SC devices and ICs, by humans or machines or both, is a source of such excess voltage. Accordingly, it is commonplace to provide an ESD clamp (voltage limiting device) across the input/output (I/O) and other terminals of such SC devices and IC's. FIG. 1 is a simplified schematic diagram of circuit 20 wherein ESD clamp 21 is placed between input/output (I/O) terminals 22 and ground or common terminal 23 of a SC device or IC to protect the other devices on the chip, that is, to protect circuit core 24 which is also coupled to I/O terminals 22 and common (e.g., "GND") terminal 23. Zener diode symbol 21' within ESD clamp 21 indicates that the function of ESD clamp 21 is to limit the voltage than can appear across circuit core 24 irrespective of the voltage applied to external terminals 22, 23. As used herein, the abbreviation "GND" is intended to refer to the common or reference terminal of a particular circuit or electronic element, irrespective of whether it is actually coupled to an earth return.

FIG. 2 is a simplified schematic diagram illustrating internal components of prior art ESD clamp 31 which is inserted in circuit 20 in place of ESD clamp 21. ESD clamp 31 comprises bipolar transistor 25, having emitter 26, collector 27 and base 28, resistance 29 and Zener diode 30 having terminals 301, 302. Resistance 29 includes the inherent resistance of the base region of transistor 25 and any discrete resistance provided external to transistor 25. In some applications it is common to externally directly connect the base and emitter contacts in which case resistance 29 represents the inherent base resistance and any small contact resistance. The purpose of resistance 29 (and analogous resistances 29, 39, 39' in FIGS. 4-7) is to keep the base and emitter at substantially the same potential unless there is an ESD event, so that in normal operation of circuit 20, ESD clamp 31 does not interfere with the operation of circuit core 24. When the voltage across terminals 22, 23 rises beyond a predetermined limit, Zener diode 30 turns on, thereby switching bipolar transistor 25 into conduction and desirably clamping the voltage across terminals 22, 23 at a level below a value capable of damaging circuit core 24. Design, construction and operation of such ESD devices is described for example in commonly owned U.S. Pat. No. 7,164,566 B2 "Electrostatic Discharge Protection Device and Method Therefore" by Hongzhong Xu et al, and further described by Danielle Coffing and Richard Ida in "*Analysis of a Zener-Triggered Bipolar ESD Structure in a BiCMOS Technology*", IEEE BCTM 1998, pages 31-34, and by Joshi, Ida, Givelin and Rosenbaum in "*An Analysis of Bipolar Breakdown and its Application to the Design of ESD Protection Circuits*", IEEE 01CH37167, 39th Annual International Reliability Physics Symposium, Orlando, Fla., 2001, pages 240-245. FIG. 3 is an illustration of a typical current-voltage characteristic of an ESD clamp, where voltage $V_{t1}$ is referred to as the trigger voltage and voltage $V_h$ is referred to as the holding voltage.

BRIEF DESCRIPTION OF THE DRAWINGS

The present invention will hereinafter be described in conjunction with the following drawing figures, wherein like numerals denote like elements, and wherein:

FIG. 1 is a simplified schematic diagram of a generalized ESD protection circuit using an ESD clamp to protect a circuit core from electrostatic discharge (ESD) events;

FIG. 2 is a simplified schematic diagram illustrating internal components of a prior art ESD clamp;

FIG. 3 is an illustration of a typical current-voltage characteristic of the ESD clamp of FIG. 2;

FIG. 4 is a simplified schematic diagram illustrating internal components of an ESD clamp according to an embodiment of the present invention;

FIG. 5 is a simplified schematic diagram illustrating internal components of an ESD clamp according to a further embodiment of the present invention;

FIG. 6 is a simplified schematic diagram illustrating internal components of an ESD clamp according to a still further embodiment of the present invention;

DETAILED DESCRIPTION OF THE INVENTION

Figure 7:
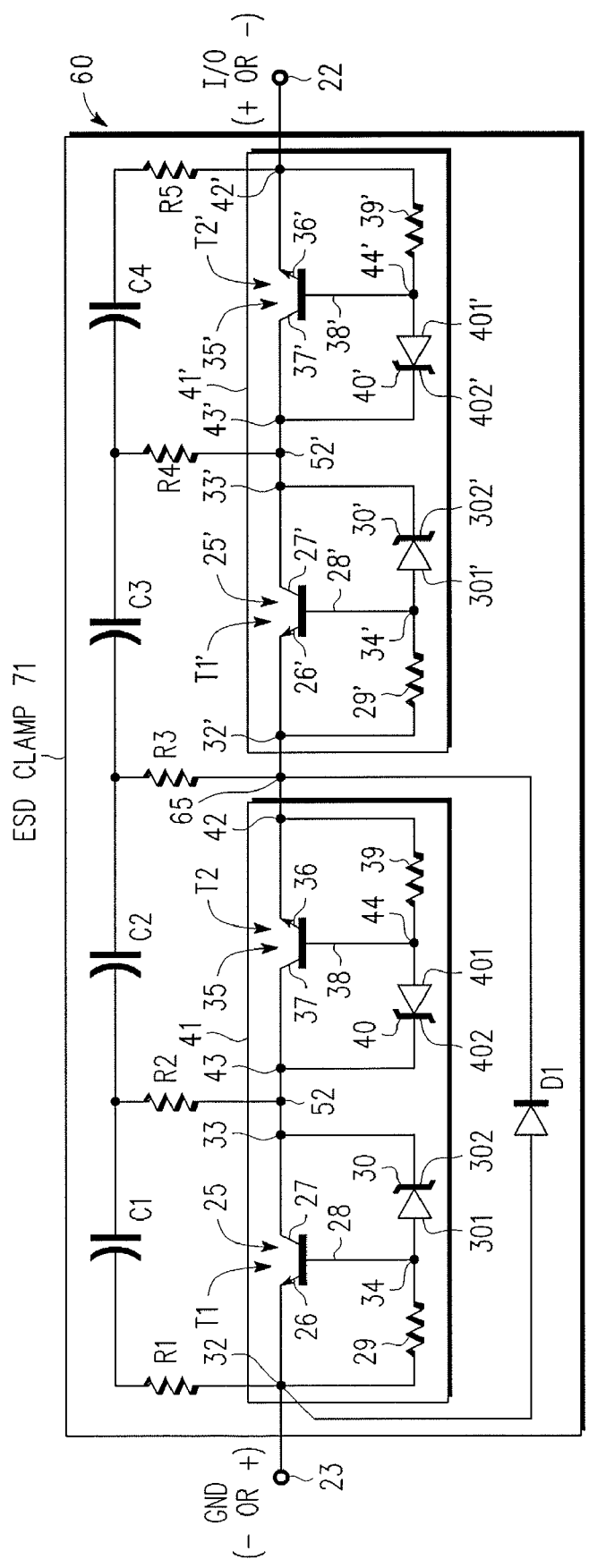
FIG. 7 is a simplified schematic diagram illustrating internal components of an ESD clamp according to a yet further embodiment of the present invention.

The following detailed description is merely exemplary in nature and is not intended to limit the invention or the application and uses of the invention. Furthermore, there is no intention to be bound by any expressed or implied theory presented in the preceding technical field, background, or the following detailed description.

For simplicity and clarity of illustration, the drawing figures illustrate the general manner of construction, and descriptions and details of well-known features and techniques may be omitted to avoid unnecessarily obscuring the invention. Additionally, elements in the drawings figures are not necessarily drawn to scale. For example, the dimensions of some of the elements or regions in the figures may be exaggerated relative to other elements or regions to help improve understanding of embodiments of the invention.

The terms "first," "second," "third," "fourth" and the like in the description and the claims, if any, may be used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have" and any variations thereof, are intended to cover non-exclusive inclusions, such that a process, method, article, or apparatus that comprises a list of elements is not necessarily limited to those elements, but may include other elements not expressly listed or inherent to such process, method, article, or apparatus. The term "coupled," as used herein, is defined as directly or indirectly connected in an electrical or non-electrical manner.

While the circuit of FIG. 2 can be very effective in providing ESD protection, further improvements are needed, especially to protect against fast rise-time ESD transients, such as encountered in connection with charge device model (CDM) testing as opposed to human body model (HBM) testing, and their real-world equivalents. HBM testing is intended to replicate the ESD transients encountered in the real world when the electronic device is touched by a charged human being. CDM testing is intended to better replicate the conditions in the real world where the component itself (e.g., the SC device or IC) may become charged, thus causing an ESD event. HBM testing is the oldest and most commonly used ESD evaluation method and typically involves subjecting the device under test (DUT) to pulses having a rise time of the order of 10 nanoseconds. By comparison, CDM testing subjects the DUT to transients with a rise-time of the order of 100 picoseconds or less, which is two orders of magnitude faster than that encountered during HBM testing. The differences in pulse rise times for CDM and HBM tests reflect the differences in real-world ESD events arising from such different causes. It has been found that the response of ESD protection elements such as that illustrated in FIG. 2 can vary significantly and in unpredictable ways depending upon the rise-time of the stress transient.

Accordingly, there is an ongoing need to provide improved ESD clamps, especially ESD clamps that are less sensitive to the rise time of the ESD transients. Further, it is desirable that the improved ESD clamps be adapted to consistently handle a variety of predetermined trigger voltages. Furthermore, other desirable features and characteristics of the present invention will become apparent from the subsequent detailed description of the invention and the appended claims, taken in conjunction with the accompanying drawings and this background of the invention.

FIG. 4 is a simplified schematic diagram illustrating internal components of a known ESD clamp 41, according to an embodiment of the present invention. ESD clamp 41 is used in generalized protection circuit 20 in place of ESD clamp 21. ESD clamp 41 differs from prior art ESD clamp 31 of FIG. 2 in that it utilizes two series coupled transistor stages T1 and 12 joined in mirror configuration at node 52. Transistor stage T1 comprises transistor 25 analogous to transistor 25 of FIG. 2 with emitter 26, collector 27 and base 28, plus resistance 29 and Zener diode 30, coupled in generally the same manner as in FIG. 2. The same reference numbers are used for transistor stage T1 and ESD clamp 31 of FIG. 2 to indicate that the individual elements are analogous but not necessarily identical. Resistor 29 is coupled between base 28 at node 34 and emitter 26 at node 32. Node 32 is adapted to be coupled to GND terminal 23 of ESD protection circuit 20 of FIG. 1. As noted in connection with FIG. 2, Zener diode 30 is coupled between base 28 at node 34 and collector 27 at node 33. Node 33 is adapted to be coupled to node 43 of transistor stage T2 via node 52. Transistor stage T2 comprises transistor 35 analogous to transistor 25 of stage T1. Transistor 35 comprises emitter 36, collector 37 and base 38. Resistance 39 is coupled between base 38 at node 44 and emitter 36 at node 42. Zener diode 40 is coupled between base 38 at node 44 and collector 37 at node 43. Node 43 of Transistor stage T2 is coupled to node 33 of transistor stage T1 via node 52 in mirror configuration, collector 27 coupled to collector 37. Nodes 33, 52 and 43 are shown as separate nodes merely for convenience of description and can be combined. Node 42 of Transistor stage T2 is adapted to be coupled to input/output (I/O) terminals 22 of ESD circuit 20 of FIG. 1. It will be noted that while stages T1 and T2 of ESD clamp 41 individually resemble ESD clamp 31 of FIG. 2, that they are serially coupled in opposition, that is, node 43 of stage 12 is coupled to node 33 of stage T1, or to say it another way, collector 27 of stage T1 is coupled to collector 37 of stage 12 via common node 52. An advantage of ESD clamp 41 compared to ESD clamp 31 is that ESD clamp 41 is bi-directional, that is, it will respond, for example, to a positive going ESD transient at either of terminals 22 or 23 of ESD circuit 20. This is a significant advantage since it results in a substantial area saving in providing bi-directional ESD protection to circuit core 24, and thereby lowers the cost of manufacture of the SC device or IC containing circuit core 24 (see FIG. 1).

FIG. 5 is a simplified schematic diagram illustrating internal components of another known ESD clamp 51, wherein it will be understood that clamp 51 is substituted for clamp 21 in generalized ESD protection circuit 20 of FIG. 1. ESD clamp 51 differs from ESD clamp 41 of FIG. 4 in that it comprises two serially coupled ESD stages, that is, lower ESD stage or clamp 41 and upper ESD stage or clamp 41'. The terms "lower" and "upper" are used herein merely to indicate that one of the pair of serially coupled ESD stages (e.g., clamp 41) is coupled to so-called GND terminal 23 of ESD circuit 20 and the other of the pair of serially coupled ESD stages (e.g., clamp 41') is coupled to so-called I/O terminals 22 of ESD circuit 20 of FIG. 1, wherein GND is usually (but not always) the lower potential side of circuit 20 and the I/O terminals are coupled to what is usually (but not always) the higher potential side of ESD circuit 20. The designations of "lower" and "upper" are merely for convenience of reference and not intended to be limiting. Lower ESD stage or clamp 41 is described in connection with FIG. 4. Upper ESD stage or clamp 41' is analogous to lower ESD stage or clamp 41 and the convention is adopted of identifying the individual components thereof analogous to those of lower ESD stage or clamp 41 by adding a prime to the individual reference numbers, for example, emitter 26' of upper ESD stage or clamp 41' is analogous to emitter 26 of lower ESD stage or clamp 41, collector 27' to collector 27, and so forth. ESD stages or clamps 41, 41' are coupled so that: (i) node 42 of lower stage or clamp 41 is coupled to node 32' of upper stage or clamp 41'; (2) bottom node 32 of lower stage or clamp 41 is adapted to be coupled to GND terminal 23 of ESD circuit 20; and (iii) top node 42' of upper stage or clamp 41' is adapted to be coupled to I/O terminals 22 of ESD circuit 20. ESD clamp 51 of FIG. 5 and ESD clamps 61 and 71 of FIGS. 6 and 7 are referred to as "stacked" ESD clamps, in that they comprise serially coupled (i.e., "stacked") arrangements of lower ESD stage or clamp 41 and upper ESD stage or clamp 41', wherein the bottom node (e.g., node 32) of the stack is adapted to be coupled to GND terminal 23 and the top node of the stack (e.g., node 42') is adapted to be coupled to I/O terminal 22 of ESD circuit 20 of FIG. 1, and intermediate nodes 42, 32' are coupled together at node 65. Nodes 42, 32 and 65 are shown as separate nodes merely for convenience of description and can be combined. Such a multiple "stacked" arrangement makes it possible to obtain higher trigger voltages and holding voltages (e.g., voltage Vt1 and Vh of FIG. 3) than are generally possible with a single ESD protection stage, such as is illustrated in FIG. 4.

FIG. 6 is a simplified schematic diagram illustrating internal components of ESD clamp 61 according to a still further embodiment of the present invention, wherein it will be understood that clamp 61 is substituted for clamp 21 in ESD circuit 20 of FIG. 1. ESD clamp 61 of FIG. 6 differs from ESD clamp 51 of FIG. 5 by the addition of RC ladder 60 comprising resistances R1, R2, R3, R4, etc., and capacitances C1, C2, C3, etc. RC ladder 60 has a first terminal of resistance R1 coupled to node 32 (e.g., emitter 26) of first ESD stage or clamp 41, a first terminal of resistance R2 coupled to interior node 52 (e.g., collectors 27, 37) of first ESD stage or clamp 41, a first terminal of resistance R3 coupled to coupling node 65 (e.g., emitters 36, 26') between ESD stages or clamps 41, 41'. In further embodiments, a first terminal of resistance R4 is coupled to interior node 52' (e.g., collectors 27', 37') of second ESD stage or clamp 41' and, in a still further embodiment, a first terminal of resistor R5 is coupled to terminal node 42', (e.g., emitter 36') of second ESD stage or clamp 41'. Capacitance C1 is coupled between the second terminals of resistances R1 and R2, capacitance C2 is coupled between the second terminals of resistances R2 and R3 and, when utilized in the further embodiment, capacitance C3 is coupled between the second terminals of resistances R3 and R4, and when utilized in still further embodiments, capacitance C4 is coupled between second terminals of resistances R4 and R5. As noted above, one or both of resistances R4, R5 and associated capacitances C3, C4 may be included in some embodiments but omitted in other embodiments. While including one or both of resistances R4, R5 and associated capacitances C3, C4 is desirable, they are not essential. If capacitance C4 is included it should be robust, that is, able to withstand by itself the full operating voltage of circuit core 24 that ESD clamp 61 of FIG. 6 is intended to protect. The same consideration applies to ESD clamp 71 of FIG. 7 if C4 is included therein.

ESD clamps 51, 61, 71 of FIG. 5-7, are shown as comprising two stacked bidirectional ESD stages 41, 41', but persons of skill in the art will understand based on the explanation herein, that that any number N of such stages may be stacked, by serially coupling N such stages 41, 41', 41" . . . etc., if it is desired to achieve to higher trigger voltages. The individual stages of the stack (e.g., 41, 41', 41", etc.) may be substantially the same or different. Where N serially coupled ESD clamp stages are used, the total number of resistances and capacitances included in RC ladder 60 can also be increased, depending upon the total number of stacked stages.

Where N ESD clamp stages are provided with a first terminal of resistances R1, R2, R3, . . . etc., coupled to every node thereof (e.g., nodes 32, 52, 65 (42, 33'), 52', 42' etc.) and capacitances C1, C2, . . . etc., coupled between second terminals of the successive resistances of RC ladder 60, there will be 2N+1 resistances and 2N capacitances in RC ladder 60. However, not all such resistances and capacitances are necessary and some may be omitted. For example, and not intended to be limiting, resistance $R_{2N+1}$ having a first terminal coupled to the second (upper) terminal node (e.g., node 42') of the $N^{th}$ ESD clamp stage and capacitor $C_{2N}$ coupled between a second terminal of resistance $R_{2N+1}$ and a second terminal of resistance $R_{2N}$ coupled to the interior node of the $N^{th}$ ESD clamp stage, may be omitted. In a further embodiment, resistance $R_{2N+1}$ and resistance $R_{2N}$ and capacitances $C_{2N}$ and $C_{2N-1}$ may all be omitted, where resistance $R_{2N}$ would have had a first terminal thereof coupled to the interior node of the $N^{th}$ ESD clamp stage, resistance $R_{2N-1}$ would have a first terminal coupled to the first or lower node (e.g., node 32') of the $N^{th}$ ESD clamp stage, and capacitance $C_{2N-1}$ would have been coupled between the second terminal of $R_{2N}$ and $R_{2N-1}$. As will be subsequently shown, RC ladder 60 is useful in reducing the sensitivity of ESD clamps 61, 71 to the rise time of the ESD signal.

FIG. 7 is a simplified schematic diagram illustrating internal components of ESD clamp 71 according to a yet further embodiment of the present invention, wherein it will be understood that clamp 71 is substituted for clamp 21 in ESD circuit 20 of FIG. 1. ESD clamp 71 of FIG. 7 differs from ESD clamp 61 of FIG. 6 in that diode D1 is coupled between node 32 of lower ESD stage or clamp 41 and node 65 between lower ESD stage or clamp 41 and upper ESD stage or clamp 41'. Inclusion of Diode D1 has the advantage of providing asymmetric trigger voltages. For example, if a positive going ESD signal appears on I/O terminals 22, then the ESD clamp trigger voltage (e.g., Vt1+) is determined by the combined effect of both ESD stages or clamps 41, 41', that is, by all four ESD transistor stages T1, T2, T1', T2'. Conversely, if a positive going ESD signal appears on GND terminal 23, then diode D1 effectively bypasses ESD stage or clamp 41, that is, bypasses transistor stages T1, T2, so that the trigger voltage (e.g., Vt1−) is determined substantially only by upper ESD stage or clamp 41', that is, by transistor stages T1', T2'. This enables one ESD clamp circuit to provide significantly different trigger voltages for different polarity ESD signals. Under some circumstances, this is a very significant advantage and can substantially reduce the chip area required for ESD protection, thereby significantly reducing the manufacturing cost of the overall IC or component incorporating such ESD protection. While diode D1 is shown as being coupled between nodes 32 and 65, this is merely for convenience of explanation and not intended to be limiting. D1 or an equivalent diode may be coupled between other nodes of stacked ESD clamp 71 and in other orientations, depending upon relative trigger voltages desired for various polarities of the ESD transient and the total number of stacked stages. Further, while stacked ESD clamps 51, 61, 71 are shown as comprising two stacked ESD stages (e.g., ESD stages or clamps 41, 41'), this is merely for convenience of explanation and not intended to be limiting, and it will be understood by those of skill in the art, that more or fewer stages may also be used. This is also true of RC ladder 60 of FIGS. 6 and 7, in that more or fewer RC ladder stages may be utilized for any given number of ESD stages as well as being varied to accommodate different numbers of ESD stages.

Table I below illustrates the comparative results of using transmission line pulse testing (mimicking HBM) and very fast transmission line pulse testing (mimicking CDM) to evaluate the performance of different ESD protection arrangements. The HBM transients had pulse widths of about 100 nanoseconds with rise times of between 1 and 10 nanoseconds and the CDM transients had pulse widths of about 1 nanosecond with rise times of the order of 100 picoseconds. The HBM tests subjected the device under test to a maximum voltage of about 250 volts and pulse current limits of about 10 amps. The CDM tests subjected the device under test to a maximum voltage of about 500 volts and pulse current limit of about 20 amps. The device under test employed the ESD clamp configuration shown in FIG. 7, with and without RC ladder 60 using the resistances and capacitances listed in Table I. The tested ESD clamps were otherwise designed to provide protection for pulses above about 80 volts. Other than the presence or absence of RC ladder 60, the ESD clamp and circuit core were substantially the same among the different units being tested.

TABLE I

ESD Clamp 71 coupled to CMOS Circuit core 24

| | Tested using HBM transmission line pulses | | Tested using CDM very fast transmission line pulses | |
|---|---|---|---|---|
| | Vt1 | Vh | Vt1 | Vh |
| RC ladder 60 included, with: R1, R2, R3, R4 = 1k Ohms C1, C2, C3 = 1 picofarad | 81.1 volts | 34.0 volts | 71.87 volts | 56.1 volts |
| RC ladder 60 omitted: | 101.4 Volts | 30.7 Volts | 73 Volts | 57.5 Volts |

It will be observed from Table I that the ESD clamp including RC ladder 60 provided much more consistent trigger voltage Vt1 values under the two types of tests with significantly different pulse rise times. For example, when RC ladder 60 was included, Vt1 values of 81.1 volts were obtained for HBM transients and 71.87 volts for CDM transients, a difference of (81.1−71.87)/71.87=13%. When RC ladder 60 was omitted entirely, Vt1 values of 101.4 were obtained for HBM transients and 73 volts for CDM transients, a difference of (101.4−73)/73=39%. Similarly, Vh values differed by (34.0−56.1)/34.0=−65% with RC ladder 60 having resistances R1, R2, R3, R4 and capacitances C1, C2, C3 included, and (30.7−57.5)/30.7=−87% with RC ladder 60 omitted. Thus, inclusion of RC ladder 60 provides overall improved consistency and predictability of the Vt1 and Vh values for the ESD clamp.

In addition to providing improved performance, the inclusion of RC ladder 60 also makes it easier to predetermine the ESD clamp trigger voltage Vt1, which is a great convenience in designing for optimum protection, especially for high voltage, high power components or ICs. Table II below illustrates how Vt1 can be adjusted by using different vales of R and C in RC ladder 60. In the tests of Table II, R1=R2=R3=R4 and C1=C2=C3. The respective individual R and C values are listed in the table along with the Vt1 values provided thereby. Other elements of ESD clamps 61, 71 of FIGS. 6 and 7 were substantially the same with only the respective RC ladder values differing from test to test.

TABLE II

Trigger Voltage Vt1 for different values of R and C in RC ladder 60

| R values & C values | Vt1 Values Obtained |
|---|---|
| 1k Ohms & 1 picofarad | 81.1 volts |
| 1k Ohms & 50 femtofarads | 92.8 volts |
| 10k Ohms & 100 femtofarads | 96.7 volts |
| 10k Ohms & 500 femtofarads | 94.47 volts |
| 50k Ohms & 200 femtofarads | 97.7 volts |
| 100k Ohms & 100 femtofarads | 93.6 volts |
| 100k Ohms & 500 femtofarads | 98.2 volts |
| 500k Ohms & 1 picofarad | 97.02 volts |
| 500k Ohms & 50 femtofarads | 96.4 volts |

Figure 8:
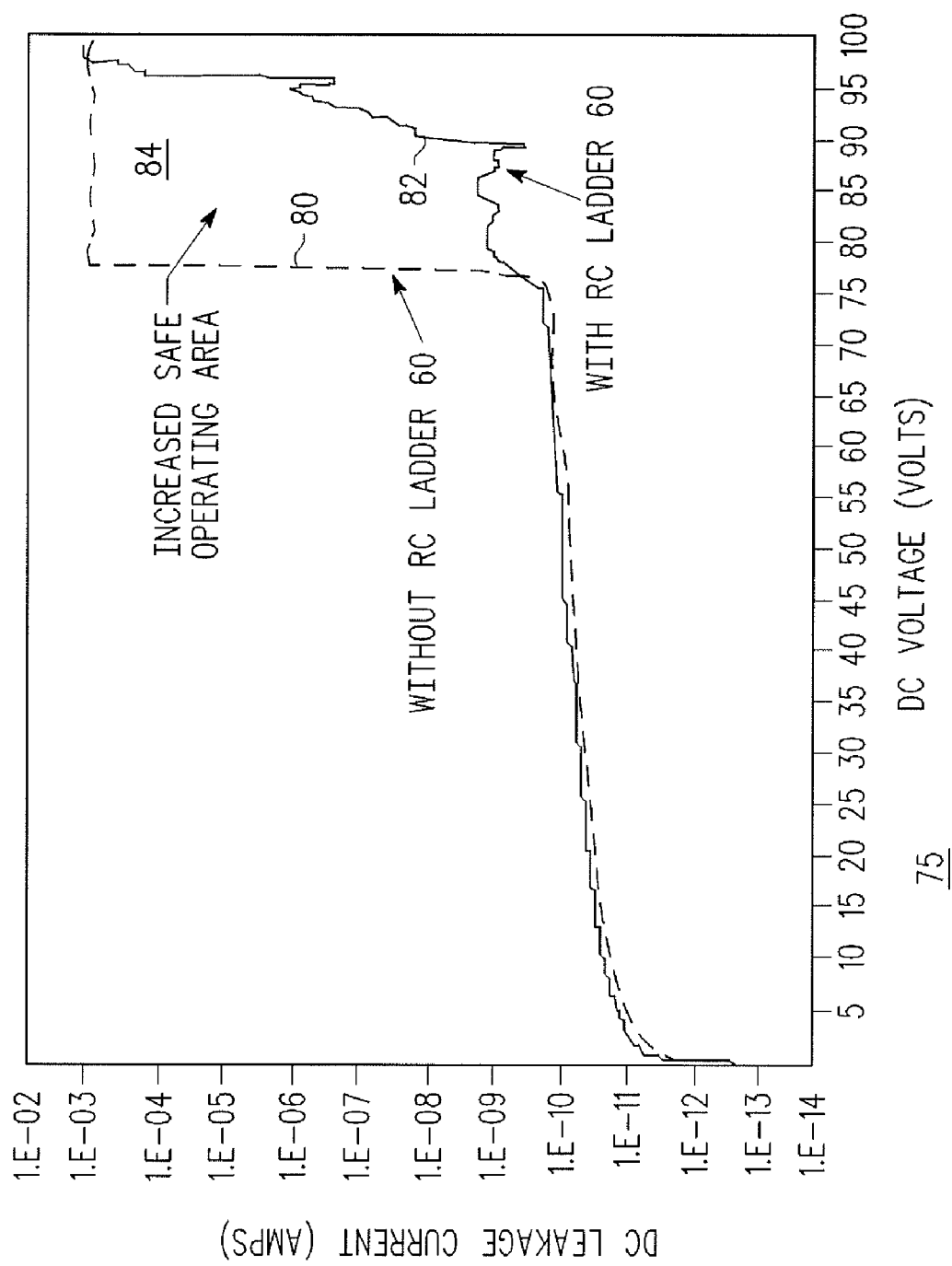
FIG. 8 is a plot of leakage current versus DC applied voltage, showing that the safe operating area is improved for a device or circuit with ESD protection according to an embodiment of the present invention.

FIG. 8 shows plot 75 of leakage current in amps versus DC applied voltage in volts, illustrating that the safe operating area is improved for a device with ESD protection according to embodiments of the present invention including RC ladder 60. Trace 80 shows the response of circuit 20 using ESD clamp 71 of FIG. 7 but without RC ladder 60 and trace 82 shows the response of substantially the same clamp but with RC ladder 60 comprising resistances R1, R2, R3, R4 and capacitances C1, C2, C3 included. It will be noted that substantially higher DC voltages can be applied before the leakage current becomes significant. Note that the current scale of FIG. 8 is logarithmic, that is, each division of the scale corresponds to an order of magnitude increase in current. The result is a substantial increase in safe operating area, which is approximately given by area 84 between the rapidly rising portions of traces 80 and 82.

According to a first embodiment, there is provided an electrostatic discharge (ESD) protection circuit, having input/output (I/O) terminals and a common terminal, adapted to protect a circuit core coupled between the I/O and common terminals, and comprising, multiple serially arranged ESD clamp stages coupled between the I/O terminals and the common terminal, and a resistance-capacitance (RC) ladder in parallel with a part of the multiple serially arranged ESD clamp stages and with resistances of the RC ladder coupled to nodes between portions of the serially arranged ESD clamp stages. In a further embodiment, the multiple serially arranged ESD clamp stages comprise first and second serially arranged ESD clamp stages and the nodes comprise a first node at a first terminal of the first ESD clamp stages, a second node internal to the first ESD clamp stage and a third node serially coupling a second terminal of the first ESD clamp stage to a first terminal of the second ESD clamp stage. In a still further embodiment, the RC ladder comprises first, second and third resistances and first and second capacitances, wherein a first terminal of the first resistance is coupled to the first node, a first terminal of the second resistance is coupled to the second node and a first terminal of the third resistance is coupled to the third node and the first capacitance is coupled between second terminals of the first and second resistances and the second capacitance is coupled between second terminals of the second and third resistances. In a yet further embodiment, the circuit further comprises a fourth resistance and a third capacitance, the fourth resistance having a first terminal thereof coupled to a fourth node internal to the second ESD stage and the third capacitance is coupled between the second terminal of the third resistance and a second terminal of the fourth resistance. In a yet still further embodiment, the circuit further comprises a diode coupled across one of the multiple serially arranged ESD clamp stages. In a still yet further embodiment, at least some of the multiple serially arranged ESD clamp stages are bi-directional. In another embodiment, the circuit further comprises a diode coupled across one of the multiple serially arranged bi-directional ESD clamp stages.

According to a second embodiment, there is provided an electrostatic discharge (ESD) protection device, coupled across input-output (I/O) and common terminals of a core circuit that it is intended to protect from ESD events, comprising, multiple serially coupled bidirectional ESD clamp stages, each ESD clamp stage comprising first and second terminal nodes and an interior node, wherein the first terminal node of a first of the serially coupled ESD clamp is coupled to the common terminal and the second terminal node of a last of the serially coupled ESD clamp stages is coupled to the I/O terminals, and a resistance-capacitance (RC) ladder with multiple resistances and capacitances, each resistance having a first terminal coupled to a node of one of the ESD clamp stages and each capacitance coupled between second terminals of successive resistances of the RC ladder. According to a further embodiment, the one of the ESD clamp stages is the first ESD clamp stage. In a still further embodiment, the RC ladder comprises a further resistance having a first terminal coupled to the interior node of a second ESD clamp stage and a further capacitor coupled between a second terminal of the further resistance and a resistance coupled to the one of the ESD clamp stages. In a yet further embodiment, the RC ladder comprises a further resistance having a first terminal coupled to the interior node of the last ESD clamp stage and a further capacitor coupled between a second terminal of the further resistance and a resistance coupled to the one of the ESD clamp stages. In a still yet further embodiment, the device further comprises a diode coupled across first and second terminal nodes of one or more of the multiple serially coupled bi-directional ESD clamp stages. In a yet still further embodiment, the diode is coupled across first and second terminal nodes of the first ESD clamp stage.

According to a third embodiment, there is provided an electrostatic discharge (ESD) protection device, coupled across input-output (I/O) and common terminals of a core circuit that it is intended to protect from ESD events, comprising, multiple serially coupled ESD clamp stages, each ESD clamp stage comprising first and second terminal nodes and an interior node, wherein the first terminal node of a first of the serially coupled ESD clamp stages is coupled to the common terminal and the second terminal node of a last of the serially coupled ESD clamp stages is coupled to the I/O terminals, and a resistance-capacitance (RC) ladder with a resistance coupled to each of the nodes of one of the ESD clamp stage by first terminals thereof and capacitors coupled between second terminals of the resistances. According to a further embodiment, each ESD clamp stage comprises first and second transistor stages serially coupled in opposition, each transistor stage having emitter, base and collector, and wherein the interior node of the ESD clamp stage couples the collectors of the first and second transistor stages. According to a still further embodiment, emitters of the first and second transistor stages are coupled respectively to the first and second terminal nodes of the ESD clamp stages. According to a yet further embodiment, the device comprises a Zener diode coupled between the collector and base of each transistor stage. According to a still yet further embodiment, an emitter of the first transistor stage of a first of the ESD clamp stages is coupled to the common terminal and an emitter of the second transistor stage of a last of the ESD clamp stages is coupled to the I/O terminals. According to a yet still further embodiment, the resistances of the RC ladder have substantially similar values and the capacitances of the RC ladder have substantially similar values. According to another embodiment, the device further comprises a diode coupled across the first and second terminal nodes of one of the ESD clamp stages While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. An electrostatic discharge (ESD) protection circuit, having an input/output (I/O) terminal and a common terminal, adapted to protect a circuit core coupled between the I/O and common terminals, and comprising:
    multiple serially arranged ESD clamp stages coupled between the I/O terminal and the common terminal; and
    a resistance-capacitance (RC) ladder in parallel with at least a part of the multiple serially arranged ESD clamp stages and with resistances of the RC ladder coupled to nodes of the serially arranged ESD clamp stages.

2. The circuit of claim 1, wherein the multiple serially arranged ESD clamp stages comprise first and second serially arranged ESD clamp stages and the nodes comprise a first node at a first terminal of the first ESD clamp stages, a second node internal to the first ESD clamp stage and a third node serially coupling a second terminal of the first ESD clamp stage to a first terminal of the second ESD clamp stage, a fourth node internal to the second ESD clamp stage and a fifth node at an end terminal of the second ESD clamp stage, wherein the first node is coupled to the common terminal and the fifth node is coupled to the I/O terminal.

3. The circuit of claim 2, wherein the RC ladder comprises first, second and third resistances and first and second capacitances, wherein a first terminal of the first resistance is coupled to the first node, a first terminal of the second resistance is coupled to the second node and a first terminal of the third resistance is coupled to the third node and the first capacitance is coupled between second terminals of the first and second resistances and the second capacitance is coupled between second terminals of the second and third resistances.

4. The circuit of claim 2, further comprising a diode coupled between the first and third nodes.

5. The circuit of claim 2, further comprising a fourth resistance and a third capacitance, the fourth resistance having a first terminal thereof coupled to the fourth node and the third capacitance is coupled between the second terminal of the third resistance and a second terminal of the fourth resistance.

6. The circuit of claim 2, further comprising a fifth resistance and a fourth capacitance, the fifth resistance having a first terminal thereof coupled to the fifth node and the fourth capacitance coupled between the second terminal of the fourth resistance and a second terminal of the fifth resistance.

7. The circuit of claim 1, wherein at least some of the multiple serially arranged ESD clamp stages are bi-directional.

8. The circuit of claim 7, further comprising a diode coupled across at least one of the multiple serially arranged bi-directional ESD clamp stages.

9. An electrostatic discharge (ESD) protection device, coupled across input-output (I/O) and common terminals of a core circuit that it is intended to protect from ESD events, comprising:
    first through N serially coupled bi-directional ESD clamp stages, each of the N ESD clamp stages comprising first and second terminal nodes and an interior node, wherein the first terminal node of the first ESD clamp stage is coupled to the common terminal, the second terminal node of the $N^{th}$ ESD clamp stages is coupled to the I/O terminal and $2^{nd}$ through the $N^{th}$ ESD clamp stages have first terminal nodes coupled to second terminal nodes of an immediately preceding ESD clamp stage, thereby forming N−1 coupling nodes between adjacent pairs of the first through N serially coupled ESD clamp stages; and
    a resistance-capacitance (RC) ladder with multiple resistances and capacitances, wherein the resistances have first terminals coupled to at least some of the nodes of the ESD clamp stages and the capacitances are coupled between second terminals of successive resistances of the RC ladder.

10. The device of claim 9, wherein first terminals of the resistances are coupled to the first node of the first ESD clamp stage, to the interior nodes of the N ESD clamp stages, to the second node of the $N^{th}$ ESD clamp stage, and to the N−1 coupling nodes between successive serially coupled ESD stages, one resistance per node, and the capacitances are coupled between second terminals of successive resistances of the RC ladder.

11. The device of claim 10, wherein the resistance having a first terminal coupled to the second node of the $N^{th}$ ESD clamp stage and the capacitance coupled to the second terminal of such resistance, or the resistance having a first terminal coupled to the interior node of the $N^{th}$ ESD stage and capacitance coupled to the second terminal of such resistance, or both such resistances and capacitances, are omitted.

12. The device of claim 9, further comprising a diode coupled across first and second terminal nodes of one or more of the N serially coupled bi-directional ESD clamp stages.

13. The device of claim 11, wherein the diode is coupled across first and second terminal nodes of the first ESD clamp stage.

14. An electrostatic discharge (ESD) protection device, coupled across input-output (I/O) and common terminals of a core circuit that it is intended to protect from ESD events, comprising:
- N serially coupled ESD clamp stages, each ESD clamp stage comprising first and second terminal nodes and an interior node, wherein the first terminal node of a first of the serially coupled ESD clamp stages is coupled to the common terminal and the second terminal node of the $N^{th}$ serially coupled ESD clamp stage is coupled to the I/O terminal; and
- a resistance-capacitance (RC) ladder with a resistance coupled to each of the nodes of one or more of the N ESD clamp stages by first terminals of the resistances and capacitors coupled between second terminals of the resistances.

15. The device of claim 14, wherein each ESD clamp stage comprises first and second transistor stages serially coupled in mirror configuration, each transistor stage having emitter, base and collector, and wherein the interior node of each ESD clamp stage couples the collectors of the first and second transistor stages.

16. The device of claim 15, wherein emitters of the first and second transistor stages are coupled respectively to the first and second terminal nodes of each ESD clamp stages.

17. The device of claim 15, further comprising a Zener diode coupled between the collector and base of each transistor stage.

18. The device of claim 15, wherein an emitter of the first transistor stage of a first of the N ESD clamp stages is coupled to the common terminal and an emitter of the second transistor stage of the $N^{th}$ ESD clamp stage is coupled to the I/O terminal.

19. The device of claim 14, wherein the resistances of the RC ladder have substantially similar values and the capacitances of the RC ladder have substantially similar values.

20. The device of claim 14, further comprising a diode coupled across the first and second terminal nodes of one of the ESD clamp stages.

* * * * *